US011821404B2

(12) United States Patent
Gollnick

(10) Patent No.: US 11,821,404 B2
(45) Date of Patent: Nov. 21, 2023

(54) METHOD AND AN APPARATUS FOR COMPUTER-IMPLEMENTED MONITORING OF ONE OR MORE WIND TURBINES IN A WIND FARM

(71) Applicant: Siemens Gamesa Renewable Energy A/S, Brande (DK)

(72) Inventor: Bert Gollnick, Hamburg (DE)

(73) Assignee: SIEMENS GAMESA RENEWABLE ENERGY A/S

( * ) Notice: Subject to any disclaimer, the term of this patent is extended or adjusted under 35 U.S.C. 154(b) by 29 days.

(21) Appl. No.: 17/628,652

(22) PCT Filed: Apr. 23, 2020

(86) PCT No.: PCT/EP2020/061401
§ 371 (c)(1),
(2) Date: Jan. 20, 2022

(87) PCT Pub. No.: WO2021/018424
PCT Pub. Date: Feb. 4, 2021

(65) Prior Publication Data
US 2022/0275787 A1  Sep. 1, 2022

(30) Foreign Application Priority Data

Jul. 26, 2019 (EP) .................................. 19188519

(51) Int. Cl.
*F03D 17/00* (2016.01)
*G06T 7/73* (2017.01)
(Continued)

(52) U.S. Cl.
CPC .......... *F03D 17/00* (2016.05); *F03D 7/0204* (2013.01); *F03D 7/048* (2013.01); *G06T 7/0004* (2013.01);
(Continued)

(58) Field of Classification Search
CPC combination set(s) only.
See application file for complete search history.

(56) References Cited

U.S. PATENT DOCUMENTS

2011/0084486 A1 * 4/2011 Yoneda ................. F03D 1/0675
290/44
2019/0072082 A1   3/2019 Lysgaard et al.

FOREIGN PATENT DOCUMENTS

DE    102011088447 A1 *  6/2013 .......... F03D 11/0091
EP    2940295 A1    11/2015
(Continued)

OTHER PUBLICATIONS

PCT International Search Report and Written Opinion of International Searching Authority dated Jul. 22, 2020 corresponding to PCT International Application No. PCT/EP2020/061401 filed Apr. 23, 2020.

*Primary Examiner* — Audrey B. Walter
(74) *Attorney, Agent, or Firm* — Schmeiser, Olsen & Watts LLP

(57) ABSTRACT

Provided is a method for computer-implemented monitoring of wind turbines in a wind farm each wind turbine including, an upper section being pivotable around a vertical yaw axis wherein the following steps are performed:
i) obtaining a digital image of the upper section of the first wind turbine, the image being a current image taken by a camera installed on the upper section of the second wind turbine;
ii) determining a yaw misalignment angle between the first and second wind turbines by processing the image by a trained data driven model, where the image is fed as a digital input to the trained data driven model and the trained data driven model provides the yaw misalignment angle as a digital output, the yaw misalign-
(Continued)

ment angle being the obtuse angle between the rotor axis of the first wind turbine and the rotor axis of the second wind turbine.

11 Claims, 1 Drawing Sheet

(51) Int. Cl.
*G06T 7/00* (2017.01)
*F03D 7/02* (2006.01)
*F03D 7/04* (2006.01)

(52) U.S. Cl.
CPC ............ *G06T 7/73* (2017.01); *F05B 2260/80* (2013.01); *F05B 2260/84* (2013.01); *F05B 2270/329* (2013.01); *F05B 2270/8041* (2013.01); *G06T 2200/24* (2013.01); *G06T 2207/20084* (2013.01); *G06T 2207/30164* (2013.01)

(56) References Cited

FOREIGN PATENT DOCUMENTS

| | | |
|---|---|---|
| EP | 3023636 A1 | 5/2016 |
| GB | 2568676 A | 5/2019 |

\* cited by examiner

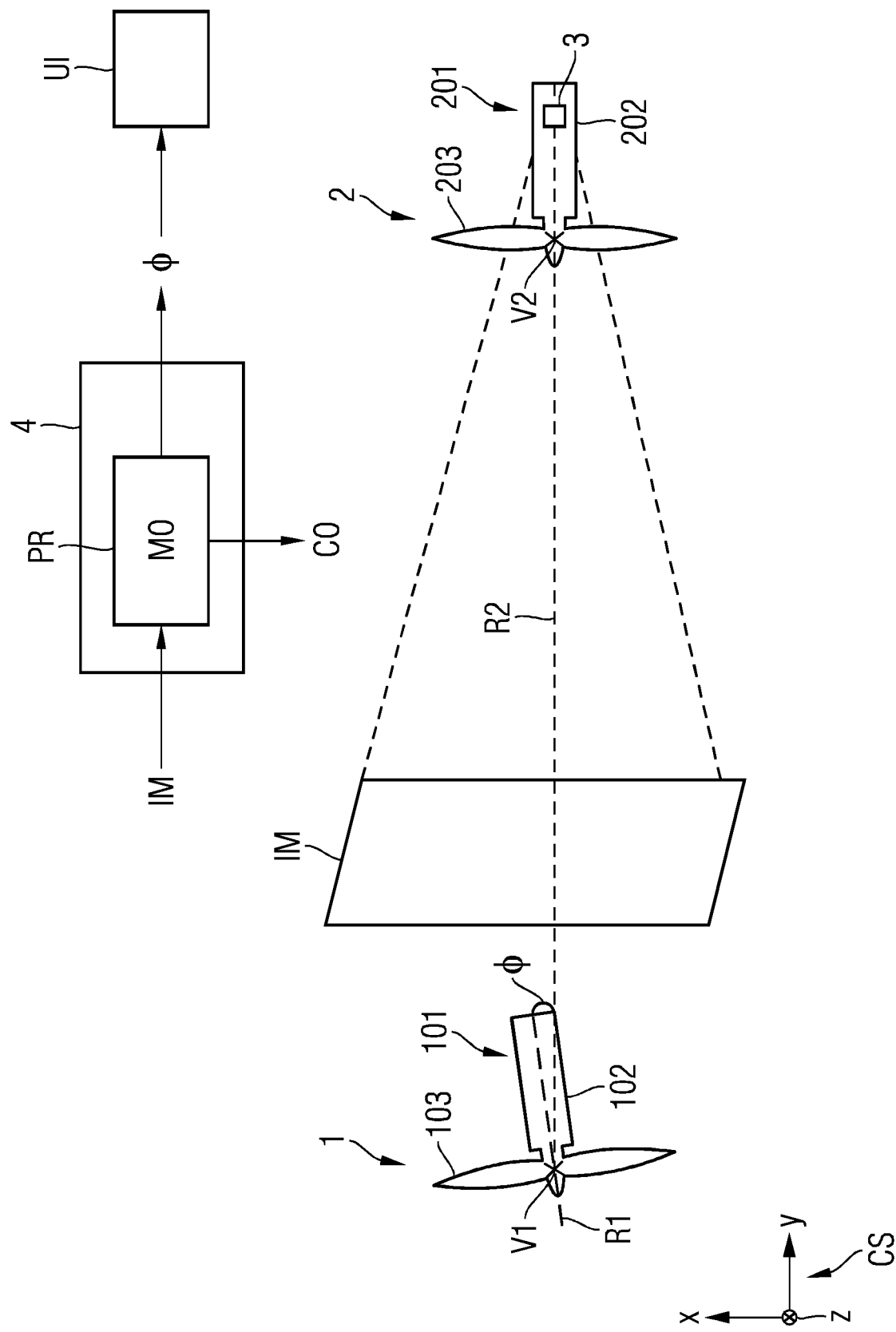

METHOD AND AN APPARATUS FOR COMPUTER-IMPLEMENTED MONITORING OF ONE OR MORE WIND TURBINES IN A WIND FARM

This application claims priority to PCT Application No. PCT/EP2020/061401, having a filing date of Apr. 23, 2020, which is based off of EP Application No. 19188519.3, having a filing date of Jul. 26, 2019, the entire contents both of which are hereby incorporated by reference.

FIELD OF TECHNOLOGY

The following relates to a method and an apparatus for computer-implemented monitoring of one or more wind turbines in a wind farm.

BACKGROUND

Wind turbines of wind farms comprise an upper section with a rotor and a nacelle on the top of a tower, where the upper section can be rotated around a vertical yaw axis in order to vary the yaw angle of the respective turbine. The yaw angle of a wind turbine is usually adjusted such that the rotor of the wind turbine faces the wind. To do so, wind sensors (i.e., anemometers) are installed on the respective wind turbines to estimate the wind direction. The measurements provided by the wind sensors are often imprecise and, thus, result in a yaw misalignment of the corresponding wind turbine, i.e., the turbine is not aligned with the wind direction. This yaw misalignment causes power loss in the production of electric energy in the wind farm and shall be avoided.

SUMMARY

An aspect relates to provide an easy method in order to detect yaw misalignments of wind turbines within a wind farm.

Embodiments of the invention provide a method for computer-implemented monitoring of one or more wind turbines in a wind farm. The wind farm comprises a first wind turbine and a second wind turbine, i.e., a pair of first and second wind turbines. The method is applied to this pair and may also be applied to several of such pairs. Each of the first and second wind turbines comprises an upper section on top of a tower, the upper section being pivotable around a vertical yaw axis and having a nacelle and a rotor with rotor blades. The rotor is attached to the nacelle and the rotor blades are rotatable by wind around a horizontal rotor axis.

According to the method of embodiments of the invention, the following steps i) and ii) are performed at each time point of one or more time points during the operation of the wind farm.

In step i), an image of the upper section of the first wind turbine is obtained. In the following, the term "image" refers to a digital image. The term "obtaining an image" means that the image is received by a processor implementing the method of embodiments of the invention. The digital image is a current image (i.e., an up-to-date image) taken by a camera installed at the upper section of the second wind turbine. The term "camera" refers to an imaging device working in at least a part of the spectrum between ultraviolet and infrared light. E.g., the camera may work in the spectrum of visible light. In an embodiment, the camera works in the infrared spectrum of light so that images may also be obtained at night.

In step ii), a yaw misalignment angle between the first and second turbines is determined by processing the image by a trained data driven model, where the image is fed as a digital input to the trained data driven model and where the trained data driven model provides the yaw misalignment angle as a digital output. This yaw misalignment angle is the obtuse angle between the rotor axis of the first wind turbine and the rotor axis of the second wind turbine.

The method of embodiments of the invention provides an easy and straightforward method for determining yaw misalignments based on images of a camera. To do so, a trained data driven model is used. This model is trained by training data comprising a plurality of images of the upper section of a first wind turbine taken by a camera installed at the upper section of a second wind turbine together with the information about the yaw misalignment angle captured in the respective image of the training data.

Any known data driven model being learned by machine learning may be used in the method according to embodiments of the invention. In an embodiment, the trained data driven model is a neural network, such as a Convolutional Neural Network which is particularly suitable for processing image data. Nevertheless, other trained data driven models may also be implemented in the method of embodiments of the invention, e.g. models based on decision trees or Support Vector Machines.

In an embodiment of the invention, an information based on the yaw misalignment angle (i.e., based on the digital output of the data driven model) is output via a user interface. E.g., the yaw misalignment angle itself may be output via the user interface. Alternatively or additionally, a warning may be provided via the user interface in case that the yaw misalignment angle exceeds a predetermined threshold. Thus, a human operator is informed about an unacceptable yaw misalignment angle so that he can initiate appropriate counter measures by adjusting the yaw offset angles of the wind turbines in order to enhance the generated electric power of the wind farm. The user interface comprises a visual user interface but it may also comprise a user interface of another type (e.g. an acoustic user interface).

In another embodiment, the method of the invention generates control commands for the first and second turbines. The control commands are such that the upper section of the first wind turbine and the upper section of the second wind turbine are rotated around their corresponding yaw axes in opposite directions by half of the amount of the yaw misalignment angle so that the yaw misalignment angle becomes zero. This embodiment enables an automatic alignment of the first and second turbines to each other. This reduces a power loss due to yaw misalignment significantly, although it is not known which wind turbine is not correctly aligned with the wind direction.

In another embodiment, the camera taking the images is mounted on the nacelle of the second wind turbine. This position provides a good view of the first turbine resulting in high-quality images taken by the camera.

In another embodiment, the second wind turbine is located downstream with respect to the wind direction relative to the first wind turbine, where the image taken by the camera shows an end of the upper section of the first wind turbine opposite to an end of the upper section where the rotor is attached to the nacelle of the first wind turbine. Those images enable a high precision in detecting the yaw misalignment angle. In an alternative embodiment, the camera may also be installed on an upstream first wind turbine in order to take images of the rotor side of a downstream second wind turbine.

Besides the above method, embodiments of the invention refer to an apparatus for computer-implemented monitoring of one or more wind turbines in a wind farm, where the apparatus is configured to perform the method according to embodiments of the invention or one or more embodiments of the method according to the invention.

Moreover, embodiments of the invention refer to a computer program product (non-transitory computer readable storage medium having instructions, which when executed by a processor, perform actions) with a program code, for carrying out the method according to embodiments of the invention or one or more embodiments thereof when the program code is executed on a computer.

Furthermore, embodiments of the invention refer to a computer program with a program code for carrying out the method according to embodiments of the invention or one or more embodiments thereof when the program code is executed on a computer.

BRIEF DESCRIPTION

Some of the embodiments will be described in detail, with reference to the following figures, wherein like designations denote like members, wherein:

FIG. 1 is a schematic illustration of a wind farm comprising a controller for performing an embodiment of the invention.

DETAILED DESCRIPTION

FIG. 1 shows in the lower part a section of a wind farm comprising a first wind turbine 1 and a second wind turbine 2. The wind farm has more than those two wind turbines. The method described herein is applied to the wind turbines 1 and 2. Nevertheless, the method may also be applied to other pairs of wind turbines being part of the wind farm.

The wind turbines are shown in plan view from above. A 3D coordinate system CS for indicating the spatial arrangement of the wind turbines is part of FIG. 1. The vertical direction is indicated by the z-axis of the coordinate system CS whereas the directions parallel to the horizontal direction are indicated by the x-axis and y-axis of the coordinate system CS. The wind direction is along the x-axis of the coordinate system CS.

Wind turbine 1 which is an upstream turbine with respect to the wind direction comprises an upper section 101 being located on top of a tower (not shown) which extends in the vertical z-direction. The upper section comprises a nacelle 102 accommodating an electric generator for generating electricity. Furthermore, the upper section 101 comprises a rotor 103 having three rotor blades with an angle of 120° therebetween where FIG. 1 only shows two of those blades. The rotor 103 is rotated around the horizontal rotor axis R1 by wind resulting in the generation of electricity by the generator within the nacelle 102. The upper section 101 of the turbine 1 can be pivoted around the vertical yaw axis V1.

Wind turbine 2 which is located downstream with respect to the wind direction has the same construction as wind turbine 1. I.e., wind turbine 2 comprises an upper section 201 located at the top of a vertical tower, the upper section 201 comprising a nacelle 202 accommodating a generator as well as a rotor 203 attached to the nacelle 202. Due to the rotation of the rotor by wind around the horizontal rotor axis R2, electricity is generated by the generator within the nacelle 202. Analogously to turbine 1, turbine 2 can be pivoted around a vertical yaw axis V2.

The yaw angles of the upper sections 101 and 201 around the respective yaw axes V1 and V2 are adjusted such that the rotor axes R1 and R2 correspond to the wind direction measured by respective wind sensors installed at both wind turbines 1 and 2. However, due to imprecise measurements of the wind sensors, a yaw misalignment may occur. This yaw misalignment is indicated by the yaw misalignment angle $\phi$ in FIG. 1. This angle is the obtuse angle between the rotor axis R1 of the wind turbine 1 and the rotor axis R2 of the wind turbine 2.

Even small yaw misalignments lead to high losses of electric power produced by the wind farm. The method as described in the following provides an easy method to detect and correct those yaw misalignments. To do so, the downstream wind turbine 2 comprises a camera 3 installed on the nacelle 201. The camera 3 is positioned such that it takes images IM of the rear side of the wind turbine 1. The camera is working in the visible light spectrum and also in the infrared light spectrum so that the method as described herein may also be performed at night. The respective images IM of the camera 3 are transferred by a suitable communication link to a controller 4 of the wind farm. The controller comprises a processor PR implementing a trained data driven model MO receiving a respective image IM as a digital input and providing a yaw misalignment angle $\phi$ as a digital output.

In the embodiment described herein, the trained data driven model MO is based on a Convolutional Neural Network having learned beforehand by training data. The training data comprise a plurality of images of an upstream turbine taken by the camera of a downstream turbine together with the information of the yaw misalignment angle occurring in the respective image. Convolutional Neural Networks are well known from the related art and are particularly suitable for processing digital images. A Convolutional Neural Network comprises convolutional layers followed by pooling layers as well as fully connected layers in order to determine at least one property of the respective image where the property according to embodiments of the invention is the yaw misalignment angle.

In the embodiment of FIG. 1, the yaw misalignment angle $\phi$ produced as an output of the model MO results in an output on a user interface UI which is only shown schematically. The user interface UI comprises a display. The user interface provides information for a human operator. The output based on the yaw misalignment angle may be the angle itself so that the operator is informed about the misalignment. Alternatively or additionally, the output may be a warning in case that the yaw misalignment angle exceeds a predetermined threshold.

In the embodiment of FIG. 1, the yaw misalignment angle $\phi$ determined by the model MO also results in control commands CO which are provided to the wind turbines 1 and 2 in order to adjust the yaw angles of the turbines. The control commands are such that the wind turbines 1 and 2 are rotated in opposite directions around their respective yaw axis V1 and V2 by an angle which is half of the yaw misalignment angle so that the yaw misalignment angle will become zero. Hence, the controller 4 enables an automatic adjustment of the yaw angles to eliminate yaw misalignment between the wind turbines 1 and 2 resulting in a significantly reduced loss of generated electric power produced by the wind farm.

Embodiments of the invention as described in the foregoing have several advantages. Particularly, an easy and straightforward method in order to detect yaw misalignments between adjacent turbines is provided. To do so, the yaw misalignment is determined based on images of a camera via a suitably trained data driven model. In an embodiment, the yaw angles of the wind turbines are also automatically controlled based on the yaw misalignment determined by the data driven model in order to reduce electric power losses.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented monitoring of one or more wind turbines in a wind farm where the wind farm comprises a first wind turbine and a second wind turbine, each of the first and second wind turbines, comprising an upper section on top of a tower, the upper section being pivotable around a vertical yaw axis and having a nacelle and a rotor with rotor blades, the rotor being attached to the nacelle and the rotor blades being rotatable by wind around a horizontal rotor axis, wherein at each time point of one or more time points during the operation of the wind farm the following steps are performed:
   i) obtaining a digital image of the upper section of the first wind turbine, the image being a current image taken by a camera installed on the upper section of the second wind turbine;
   ii) determining a yaw misalignment angle between the first and second wind turbines by processing the image by a trained data driven model, where the image is fed as a digital input to the trained data driven model and the trained data driven model provides the yaw misalignment angle as a digital output, the yaw misalignment angle being the obtuse angle between the rotor axis of the first wind turbine and the rotor axis of the second wind turbine; and
   iii) generating control commands to adjust yaw angles of the first and second wind turbines based on the yaw misalignment angle.

2. The method according to claim 1, wherein an information based on the yaw misalignment angle is output via a user interface.

3. The method according to claim 1, wherein the control commands are generated for the first and second wind turbines so that the upper section of the first wind turbine and the upper section of the second wind turbine are pivoted around their corresponding yaw axes in opposite directions by half of the amount of the yaw misalignment angle such that the yaw misalignment angle becomes zero.

4. The method according to claim 1, wherein the camera is mounted on the nacelle of the second wind turbine.

5. The method according to claim 1, wherein the second wind turbine is located downstream with respect to the wind direction relative to the first wind turbine, where the image taken by the camera shows an end of the upper section of the first wind turbine opposite to an end of the upper section where the rotor is attached to the nacelle of the first wind turbine.

6. The method according to claim 1, wherein the trained data driven model is a neural network.

7. An apparatus for computer-implemented monitoring of one or more wind turbines in a wind farm where the wind farm comprises a first wind turbine and a second wind turbine, each of the first and second wind turbines comprising an upper section on top of a tower, the upper section being pivotable around a vertical yaw axis and having a nacelle and a rotor with rotor blades, the rotor being attached to the nacelle and the rotor blades being rotatable by wind around a horizontal rotor axis, wherein the apparatus comprises a processor configured to perform at each time point of one or more time points during the operation of the wind farm the following steps:
   i) obtaining a digital image of the upper section of the first wind turbine, the image being a current image taken by a camera installed on the upper section of the second wind turbine;
   ii) determining a yaw misalignment angle between the first and second wind turbines by processing the image by a trained data driven model, where the image is fed as a digital input to the trained data driven model and the trained data driven model provides the yaw misalignment angle as a digital output, the yaw misalignment angle being the obtuse angle between the rotor axis of the first wind turbine and the rotor axis of the second wind turbine; and
   iii) generating control commands to adjust yaw angles of the first and second wind turbines based on the yaw misalignment angle;
   wherein the apparatus is configured to perform the method according to claim 6.

8. A computer program product, comprising a computer readable hardware storage device having computer readable program code stored therein, said program code executable by a processor of a computer system to implement a method with program code, which is stored on a non-transitory machine-readable carrier, for carrying out the method according to claim 1 when the program code is executed on a computer.

9. A computer program with program code for carrying out the method according to claim 1 when the program code is executed on a computer.

10. An apparatus for computer-implemented monitoring of one or more wind turbines in a wind farm where the wind farm comprises a first wind turbine and a second wind turbine, each of the first and second wind turbines comprising an upper section on top of a tower, the upper section being pivotable around a vertical yaw axis and having a nacelle and a rotor with rotor blades, the rotor being attached to the nacelle and the rotor blades being rotatable by wind around a horizontal rotor axis, wherein the apparatus comprises a processor configured to perform at each time point of one or more time points during the operation of the wind farm the following steps:
   i) obtaining a digital image of the upper section of the first wind turbine, the image being a current image taken by a camera installed on the upper section of the second wind turbine;
   ii) determining a yaw misalignment angle between the first and second wind turbines by processing the image by a trained data driven model, where the image is fed as a digital input to the trained data driven model and the trained data driven model provides the yaw misalignment angle as a digital output, the yaw misalignment angle being the obtuse angle between the rotor axis of the first wind turbine and the rotor axis of the second wind turbine; and
   iii) generating control commands to adjust yaw angles of the first and second wind turbines based on the yaw misalignment angle.

11. A wind farm comprising a first wind turbine and a second wind turbine, each of the first and second wind turbines comprising an upper section on top of a tower, the upper section being pivotable around a vertical yaw axis and having a nacelle and a rotor with rotor blades, the rotor being attached to the nacelle and the rotor blades being rotatable by wind around a horizontal rotor axis, wherein the wind farm comprises the apparatus according to claim 10.

\* \* \* \* \*